United States Patent [19]

Massol

[11] Patent Number: 4,534,796

[45] Date of Patent: Aug. 13, 1985

[54] GLASS FIBERS FOR THE REINFORCEMENT OF CEMENT

[75] Inventor: Jean-Jacques Massol, Asnieres, France

[73] Assignee: Isover Saint-Gobain, Neuilly-sur-Seine, France

[21] Appl. No.: 307,448

[22] Filed: Oct. 1, 1981

Related U.S. Application Data

[63] Continuation of Ser. No. 115,679, Jan. 28, 1980, abandoned.

[30] Foreign Application Priority Data

Jan. 30, 1979 [FR] France ................. 79 02276

[51] Int. Cl.$^3$ .......................... C04B 7/02; C04B 31/06
[52] U.S. Cl. .......................... 106/99; 501/38
[58] Field of Search .................... 501/38; 106/99

[56] References Cited

U.S. PATENT DOCUMENTS

| | | | |
|---|---|---|---|
| 3,044,888 | 7/1962 | Provance | 501/38 |
| 3,573,078 | 3/1971 | Bacon | 501/38 |
| 3,736,162 | 5/1973 | Chvalovsky et al. | 501/38 |
| 3,861,926 | 1/1975 | Irlam | 501/38 |
| 3,901,720 | 8/1975 | Majumdar | 501/38 |
| 3,904,424 | 9/1975 | Aoki et al. | 501/38 |

FOREIGN PATENT DOCUMENTS

| | | | |
|---|---|---|---|
| 1026928 | 3/1958 | Fed. Rep. of Germany . | |
| 1040444 | 10/1958 | Fed. Rep. of Germany . | |
| 1582381 | 9/1969 | France | 501/38 |
| 52-04520 | 1/1977 | Japan | 501/38 |

*Primary Examiner*—Mark L. Bell
*Attorney, Agent, or Firm*—John T. Synnestvedt; Alexis Barron; John S. Child, Jr.

[57] ABSTRACT

Glass fibers are disclosed, the fibers being formed of a glass composition containing the following ingredients in the weight percentages indicated below:

$SiO_2$: 25 to 54%
$Al_2O_3$: 20 to 40%
$MgO$: 24 to 40%
$ZrO_2$: 1 to 5%
$P_2O_5$: 0 to 10%
$TiO_2$: 0 to 10%
$B_2O_3$: 0 to 10%
F: 0 to 5%
$Cr_2O_3$: 0 to 2%

It is disclosed that the sum of $2MgO + Al_2O_3$ is equal at least to 70% of the composition. The use of such fibers in cementitious products is disclosed.

5 Claims, No Drawings

GLASS FIBERS FOR THE REINFORCEMENT OF CEMENT

This application is a continuation of copending application Ser. No. 115,679, filed Jan. 28, 1980, now abandoned.

BACKGROUND

The present invention is concerned with glass fibers having high resistance to basic environments, and especially to glass fibers adapted for reinforcement of cementitious products.

Although certain proposals have been made for use of fibers formed of specially formulated glass for the reinforcement of cement products, in general, asbestos fibers are still the most favored reinforcement for such products; but such use increasingly encounters certain difficulties and objections. Thus, it is becoming increasingly difficult to produce asbestos fibers of good quality and, correlatively, the cost of such asbestos fibers is increasing to an extent which is not economically feasible for the users of the products; and still further, the harmful effects of these products in connection with pollution problems is now so well recognized as no longer to require specific demonstration.

For the above reasons, it is becoming imperative to find an alternative solution which is equally satisfactory from the technical and economic viewpoints and which also is not objectionable in relation to pollution problems. For quite a number of years, many experiments have been conducted in an effort to find a substitute reinforcement meeting all of these required conditions. One of the first such experiments was to employ traditional glasses in the formulation of the fibers, for instance, E glass or rock wools. The use of fibers made of these compositions results in failure since the fibers formed of such compositions are rapidly attacked and destroyed by the highly basic environment or matrix resulting from the hydration of cement.

In an effort to overcome this lack of chemical stability, researchers have looked toward formulation of particular glass compositions yielding fibers characterized by the best mechanical and chemical properties. This is especially true with respect to fibers formed of glasses based upon the ternary system—$SiO_2$—$Al_2O_3$—$MgO$, as is pointed out in German Patents DE No. 1,026,928 and DE No. 1,040,444. Although this approach achieved some progress or improvement with respect to fibers made of traditional glasses, nevertheless, the improvement was not sufficient, because these new types of glasses have not been well suited for this particular use. Such glasses were actually developed originally in an effort to obtain greater elasticity and an increased resistance to weathering and aging.

More recently, certain researchers have turned toward still other glass compositions, including those known as zirconium glasses. Glasses of this kind are derived from the system: $SiO_2$—$Al_2O_3$—$ZrO_2$—RO, RO representing alkaline-earth oxides (Japanese Patent No. 77 04520); and more particularly from the system: $SiO_2$—$Al_2O_3$—$ZrO_2$—$MgO$ (see U.S. Pat. No. 3,904,424); or possibly from the system: $SiO_2$—R'O—$R_2O$—$ZrO_2$, R'O representing alkaline-earth oxides, zinc and/or manganese oxides, and $R_2O$ representing alkaline oxides (see U.S. Pat. No. 3,861,926).

Various of these compositions intended for use in fiber form most commonly have a high percentage of $ZrO_2$, usually greater than 10%, and sometimes even as high as 15% or 16%*. This oxide contributes excellent chemical resistance to the glass even in highly reactive alkaline environments; but nevertheless, it does not guarantee adequate chemical resistance of the fibers when such fibers are incorporated in a cementitious product. Moreover, the proposed percentages of $ZrO_2$ increases the cost or price of the fibers to such an extent as to seriously impair the economic practicality of employing such fibers.

*Herein, wherever percentage figures are given, they are to be understood as referring to percentage by weight.

In certain of the prior proposed compositions containing a percentage of $ZrO_2$ less than 10% (see for example, the glasses described in Japanese Patent No. 77 04520), it has been found that where the content of $ZrO_2$ is lowered to a value between 5% and 10%, the chemical resistance is extensively impaired. Similarly, in the glasses proposed in French Pat. No. 1,582,318 for adequate resistance to attack of the cement, it was proposed to coat the fibers with a polymer film. These two proposals, therefore, are accompanied by disadvantages which can not be ignored or disregarded.

STATEMENT OF OBJECTS

With the foregoing in mind, it is a general objective of the present invention to provide fibers formed of glass of special composition providing much more complete achievement of the desired resistance to attack when employed in the reinforcement of cementitious products.

The glass fibers themselves may be formed from the compositions contemplated by the invention by means of any of the well-known fiberizing processes.

DETAILED DESCRIPTION

The principal ingredients of the glass employed in accordance with the present invention are $SiO_2$, $MgO$, $Al_2O_3$ and $ZrO_2$, the content of the $ZrO_2$ being limited to a percentage substantially lower than that present in prior glasses already proposed for reinforcement of cement products.

According to the present invention, the glass fiber compositions contemplated for use contain the following ingredients within the limits defined in the following table:

$SiO_2$: 25 to 54%
$Al_2O_3$: 20 to 40%
$MgO$: 24 to 40%
$ZrO_2$: 1 to 5%
$P_2O_5$: 0 to 10%
$TiO_2$: 0 to 10%
$B_2O_3$: 0 to 10%
F: 0 to 5%
$Cr_2O_3$: 0 to 2%

The sum of $2MgO + Al_2O_3$ is preferably at least 70%.

Applicant has discovered, in effect, that glass fibers made from glass as contemplated by the invention evidence a strong chemical resistance, particularly with respect to highly reactive alkaline environments, such as the matrix formed as a result of hydration of the cement in a cementitious product. With respect to the composites or products made from the cement and the fibers of the invention, this high resistance to attack results in the maintenance of high chemical characteristics, even after very severe aging conditions.

The good performance of the composites, due to the good chemical resistance of the fibers of the invention, apparently is attributable to the conjugated action of MgO, with the exclusion of any other alkaline-earth oxide, and of $ZrO_2$ introduced in the low percentages specified.

In addition to the above, the association of the $Al_2O_3$ and MgO, in the particular percentages specified, plays an important role in the behavior of the glass fibers in accordance with the invention when they are incorporated in a cement product.

However, as is known by those skilled in the art, glasses which have a low content of $SiO_2$ and are rich in $Al_2O_3$ and MgO are difficult to fuse and devitrify at high temperatures, unless other ingredients are added.

In order to overcome these disadvantages, the present invention contemplates employment of the principal ingredients within the following limits:

$SiO_2$: 35 to 54%
$Al_2O_3$: 20 to 40%
MgO: 24 to 40%
$ZrO_2$: 1 to 5%

Preferred ranges for these constituents, in accordance with the present invention, are as follows:

$SiO_2$: 40 to 51%
$Al_2O_3$: 20 to 35%
MgO: 25 to 35%
$ZrO_2$: 1 to 5%

In this preferred composition, it is also preferred that the sum of $2MgO + Al_2O_3$ should be at least equal to 75%.

According to another feature of the invention, secondary components can be added, chosen from the group consisting of $P_2O_5$, $TiO_2$, $B_2O_3$, F, $Cr_2O_3$, which may be employed either individually or in combination. With such additions, it is preferred that these components should not exceed a total of about 20% of the composition.

These added components may be employed in order to adjust or regulate the viscosity of the glass, while maintaining the desired properties of the fibers when incorporated in a cement product.

Where such added ingredients are employed, the composition desirably conforms with the following formulation:

$SiO_2$: 25 to 51%
$Al_2O_3$: 20 to 35%
MgO: 24 to 37%
$ZrO_2$: 1 to 5%
One or more of: $P_2O_5$, $TiO_2$, $B_2O_3$, F, $Cr_2O_3$: 1 to 20%

Particularly desirable results are attainable in formulations according to the following:

$SiO_2$: 28 to 48%
$Al_2O_3$: 20 to 32%
MgO: 25 to 35%
$ZrO_2$: 1 to 5%
One or more of: $P_2O_5$, $TiO_2$, $B_2O_3$, F, $Cr_2O_3$: 3 to 15%

As will be understood, glasses, in accordance with the invention, may be prepared from natural raw materials; and these ordinarily contain other elements which are commonly present in the form of impurities and of which the total sum usually does not exceed 3%. It will further be understood that a quantity of such impurities, of the order of up to about 3%, may be present whether or not any of the components of the last mentioned group are present in the glass formulation, i.e., the group consisting of $P_2O_5$, $TiO_2$, $B_2O_3$, F and $Cr_2O_3$.

The advantages obtained by employing glass fibers in accordance with the invention, as compared with known glass fibers, are particularly apparent when certain mechanical characteristics of the composite products formed with such fibers are measured. In effect, during aging tests applied to such composite products, the mechanical properties of the composite products are still present, even at the conclusion of the aging tests, and to an extent at least equal to that of composite made from known fibers having at least equal chemical resistance.

These tests are effected under the following conditions.

Mats made up of continuous and aligned filaments, bonded by a light sizing, are individually impregnated with a paste of pure Portland cement, and then stacked or piled up. This stack is subjected to compression (6 to 7 $daN/cm^2$) during the solidification of the cement, in order to achieve adhesion between the layers of the stack. The glass filaments have a diameter of about 20 $\mu$m and the gram weight of each mat is of the order of 100 $g/m^2$.

Under these conditions, the glass represents about 25% to 30% of the total weight of the composite, for instance, a volume between about 11% and 16%.

The composites produced in this way are aged at 20° C. for 7 days in a moisture-saturated atmosphere. After aging, the composites are immersed in a water bath maintained at a temperature of 80° C.

The influence of the aging is observed in flexing tests by three supports, the test pieces being 80×17 mm and of thickness between 1.5 and 2 mm. In this connection, one of the more revealing characteristics of the long-term behavior of the reinforced cement is the deformation at rupture by flexion $\epsilon$.

The method for calculating this characteristic is described in an article by J. Aveston, R. A. Mercer and J. M. Sillwood entitled, "Fibre Reinforced Cements—Scientific Foundations for Specifications" and published in the report of the conference on "Composites—Standard Testing and Design". (National Physical Laboratory, Teddington, Middlesex—Apr. 8 and 9, 1974).

EXAMPLES

A table is presented herebelow, giving examples of fibers made of specific glass formulations in accordance with the invention, numbered 1 to 12, along with examples of fibers made of glasses already known, numbered I to V. The upper part of the table gives the ingredients of each glass composition in percentage by weight. For each glass type, the value is indicated for the deformation at flexion rupture obtained at the end of three aging periods: 2, 7 and 28 days; each value shows the average of 8 measurements.

|  | 1 | 2 | 3 | 4 | 5 | 6 | 7 | 8 | 9 | 10 | 11 | Examples of Known Glasses | | | | |
|---|---|---|---|---|---|---|---|---|---|---|---|---|---|---|---|---|
|  |  |  |  |  |  |  |  |  |  |  |  | I | II | III | IV | V |
| $SiO_2$ | 43 | 33.2 | 47.3 | 29 | 33.6 | 33.6 | 41.9 | 45 | 39 | 34 | 34 | 60 | 62.7 | 58.2 | 49 | 54.9 |
| $Al_2O_3$ | 25 | 25 | 25 | 25 | 25 | 25 | 25 | 25 | 25 | 25 | 25 | 8 |  | 15 | 30 | 15 |
| MgO | 25 | 25 | 25 | 25 | 25 | 30 | 30 | 25 | 25 | 25 | 33 | 25 |  | 25 | 10 | 12.5 |
| CaO |  |  |  |  |  |  |  |  |  |  |  |  | 5.2 |  |  | 12.5 |

-continued

|  | 1 | 2 | 3 | 4 | 5 | 6 | 7 | 8 | 9 | 10 | 11 | Examples of Known Glasses ||||| 
|---|---|---|---|---|---|---|---|---|---|---|---|---|---|---|---|---|
|  |  |  |  |  |  |  |  |  |  |  |  | I | II | III | IV | V |
| $ZrO_2$ | 5 | 5 | 1 | 5 | 5 | 5 | 1 | 3 | 3 | 3 | 1 | 5 | 16.6 |  | 10 | 5 |
| $Na_2O$ |  |  |  |  |  |  |  |  |  |  |  |  | 14.6 |  |  |  |
| $P_2O_5$ |  |  |  | 5 | 5 |  |  |  |  |  |  |  |  |  |  |  |
| F |  |  |  | 5 |  |  |  |  |  |  |  |  |  |  |  |  |
| $TiO_2$ |  |  |  |  |  |  |  |  |  | 3 |  |  |  |  |  |  |
| $B_2O_3$ |  | 10 |  |  | 5 | 5 | 5 |  | 5 | 8 | 5 |  |  |  |  |  |
| $Cr_2O_3$ |  |  |  |  |  |  |  |  | 1 |  |  |  |  |  |  |  |
| Impurities: | 2 | 1.8 | 1.7 | 1 | 1.4 | 1.4 | 2.1 | 2 | 2 | 2 | 2 | 2 | 0.9 | 1.8 | 1 | 0.4 |
| $\epsilon\ (\times 10^3)$ |  |  |  |  |  |  |  |  |  |  |  |  |  |  |  |  |
| 2 days | 4.8 | 5.5 | 4.9 |  | 5.8 |  |  | 4.8 |  | 4.8 |  | 4.0 | 3.8 | 4.8 | 4.5 | 4.1 |
| 7 days | 4.7 | 5.3 | 4.7 | 5.4 | 5.8 |  |  | 4.7 | 4.3 | 4.7 |  | 3.7 | 2.3 | 4.1 | 2.9 | 2.5 |
| 28 days | 5.0 | 5.1 | 5.1 | 5.4 | 5.8 | 6.4 | 6.3 | 4.4 | 4.4 | 5.1 | 6.8 | 2.7 | 1.7 | 3.9 | 2.4 | 1.8 |

The results mentioned in the table show that the glass fibers in accordance with the invention, associated with the cement, yield composite products of which the mechanical behavior develops more favorably than that of other composites. This behavior is unexpected since the already known glasses have a resistance to alkaline solutions quite comparable to that of the glasses according to the invention.

Furthermore, it is pointed out that the glasses, according to the present invention, have compositions such that the raw materials suitable for use in making up the vitrifiable composition are naturally occurring and abundant; for example, the source minerals for the MgO can be talc or magnesite (magnesium carbonate) whether burnt or not. Even with respect to the $ZrO_2$, it is pointed out that this can be derived from minerals having a relatively small percentage of $ZrO_2$, for instance, some of the very inexpensive natural sandstones.

I claim:

1. Composite products made up of cement reinforced by the glass fibers comprising, in percentages by weight:
    $SiO_2$: 25 to 54%
    $Al_2O_3$: 20 to 40%
    MgO: 24 to 40%
    $ZrO_2$: 1 to 5%
    $P_2O_5$: 0 to 10%
    $TiO_2$: 0 to 10%
    $B_2O_3$: 0 to 10%
    F: 0 to 5%
    $Cr_2O_3$: 0 to 2%
the sum of $2MgO+Al_2O_3$ comprising at least 70% of the total weight.

2. Products in accordance with claim 1 wherein said glass fibers comprise 35 to 54% $SiO_2$.

3. Products in accordance with claim 1 wherein said glass fibers comprise:
    $SiO_2$: 40 to 51%
    $Al_2O_3$: 20 to 35%
    MgO: 25 to 35%
    $ZrO_2$: 1 to 5%
the sum of $2MgO+Al_2O_3$ comprising at least 75%.

4. Products in accordance with claim 1 wherein said glass fibers comprise:
    $SiO_2$: 25 to 51%
    $Al_2O_3$: 20 to 35%
    MgO: 24 to 37%
    $ZrO_2$: 1 to 5%
and further characterized in that it comprises at least one ingredient chosen from the following group: $P_2O_5$, $TiO_2$, $B_2O_3$, F, $Cr_2O_3$, the sum of the ingredients of said group being between 1% and 20% by weight.

5. Products in accordance with claim 1 wherein said glass fibers comprise:
    $SiO_2$: 28 to 48%
    $Al_2O_3$: 20 to 32%
    MgO: 25 to 35%
    $ZrO_2$: 1 to 5%
and further characterized in that it comprises at least one ingredient chosen from the following group: $P_2O_5$, $TiO_2$, $B_2O_3$, F, $Cr_2O_3$, the sum of the ingredients of said group being between 3% and 15% by weight.

* * * * *